2,898,389
PROCESS FOR PURIFICATION OF BENZENE

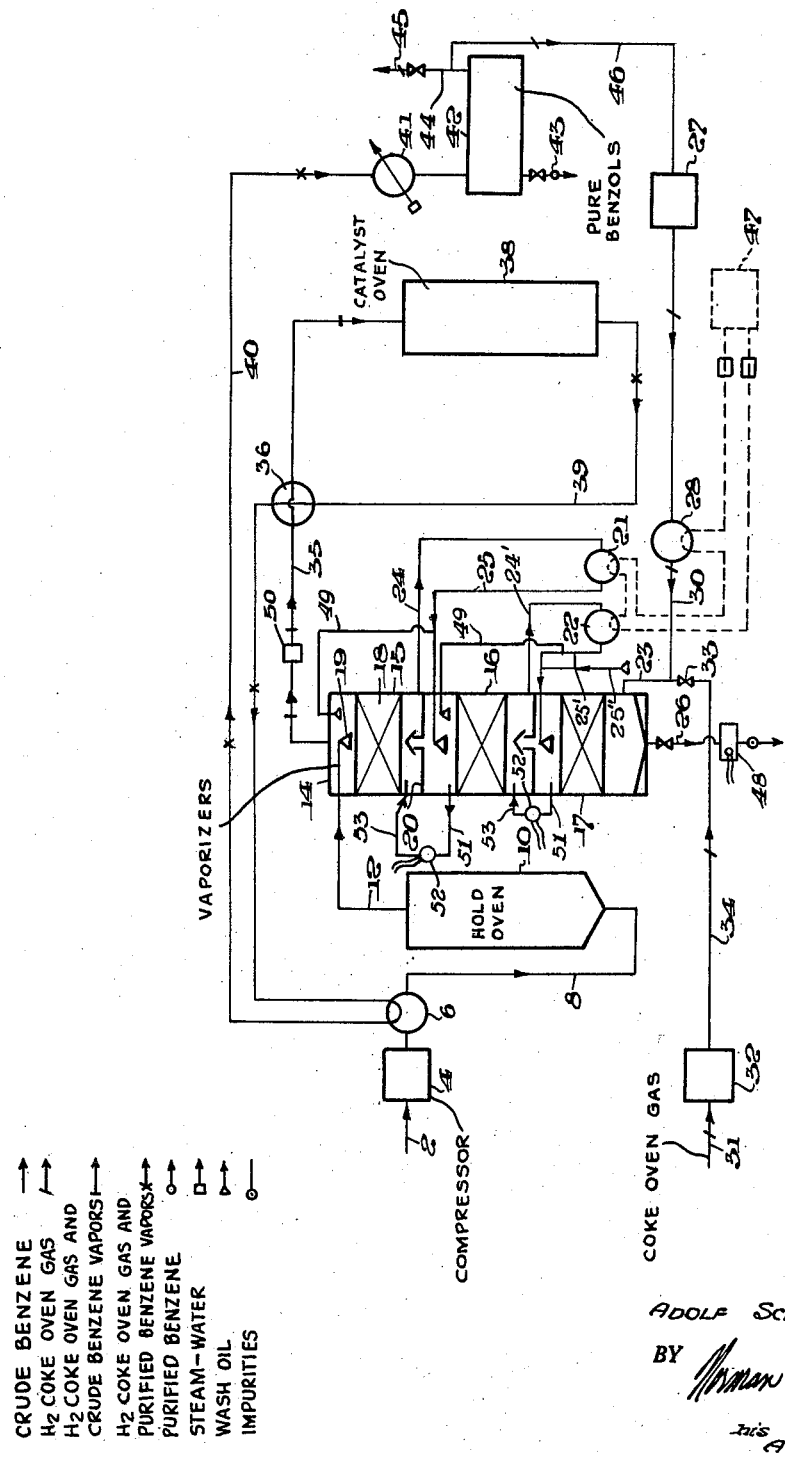

Adolf Schmalenbach, Essen-Stadtwald, Germany, assignor, by mesne assignments, to Koppers Company, Inc., Pittsburgh, Pa., a corporation of Delaware Application January 27, 1955, Serial No. 484,522

4 Claims. (Cl. 260—674)

The present invention relates to a process for the purification of crude benzene by catalytic treatment of the crude benzene with hydrogen or a hydrogen-containing gas at increased pressure and increased temperature. Such a process is known by the name "pressure refining" and is used commercially.

The essence of pressure refining consists in that the impurities present in the crude benzene, such as unsaturated, resin-forming hydrocarbons as well as sulfur and nitrogen compounds are partially converted into saturated compounds by treatment with hydrogen in the presence of suitable catalysts or are converted into hydrogen sulfide or ammonia by hydrogenation of the sulfur and nitrogen compounds. After separation of the new compounds formed from the impurities a benzene of a high degree of purity is obtained.

In the practical application of this process it has been shown that the satisfactory vaporization of the crude benzene and the entrainment of resin-containing products are particular difficulties. It has further been shown that it is not possible with present vaporization processes to prevent completely the entrainment in the benzene vapors of resin-like products contained in the benzene. Up to now operation was effected in such manner that the liquid benzene preheated by indirect heat exchange was vaporized by the addition of indirect heat either in the presence or the absence of the hydrogen necessary for the subsequent catalytic treatment. In case of addition of heat of vaporization by indirect means, namely by heated wall surfaces, a precipitate of insoluble, highly polymerized substance always formed after some time on the walls and obstructions (for example, intermediate plates or packing materials) of such vaporization columns so that after a comparatively short time an impairment of heat transfer, that is, an impairment of the vaporization efficiency, occurred which finally led to a complete obstruction of the vaporizer. The reasons are essentially that, in the case of indirect vaporization by addition of heat through heated walls, unavoidable local overheated zones occur which lead to a preferred vaporization of the low-boiling constituents. There thus occurs a local, excessive enrichment of products with high-boiling, organic substances which are converted by the influence of the high wall temperature to an insoluble precipitate which adheres to the walls.

The object of the invention is to effect the vaporization of the benzene while avoiding the indirect addition of heat during the vaporization of the benzene, so that the formation and entrainment of insoluble precipitates or incrustations is avoided in the vaporization apparatus.

In solving this problem I conceived the idea that the hydrogen-containing gas necessary for the pressure refining is able, under suitable pressure and coke oven gas temperature conditions less than 230° C., to be saturated with benzene vapors to such a degree that a sufficient vaporization of the liquid starting material is effected thereby without formation or entrainment of insoluble precipitates. In order to be able on the one hand to effect as complete a vaporization as possible, and on the other hand in order to operate without indirect addition of heat directly in the vaporization space in which the benzene vapors are present, the process of the invention is carried out in such a manner that the vaporization of benzene, preheated without noteworthy formation of vapors, is effected in several stages in such manner that in each stage a part of the benzene is vaporized (with a decrease in temperature of the liquid residue of this stage) in the presence, and under saturation by the hydrogen-containing gas. The liquid residue of each stage is again heated to the starting temperature by the addition of heat and is then added to the next stage for the purpose of vaporization of additional benzene whereby a liquid residue containing the polymerization products are withdrawn from the last stage.

The process of the invention is advantageously carried out so that the liquid benzene is added to the vaporization column divided in stages, at the top and the hydrogen-containing gas at the bottom, and that the mixture of benzene vapors and hydrogen is withdrawn overhead from the column and is then sent to the catalyst contact oven. Operation is thus effected according to a counter-current principle whereby the downwardly flowing benzene liquid continuously acts as a scrubbing medium for the gas.

The process of the invention thus avoids the addition of heat indirectly, through the walls, or the like, to the mixture of liquid benzene, benzene vapors and hydrogen-containing gas present in the vaporization column. Instead, the heat necessary for the vaporization of the benzene comes exclusively from the heat content of the liquid and gaseous products, which are correspondingly cooled thereby. Since in this type of vaporization there is no critical temperature which can cause incrustations, the formation of such incrustations and precipitates is fundamentally excluded. In order to vaporize additional benzene from the liquid residue of such a vaporization, according to a preferred embodiment of the invention, the residue is again heated to the starting temperature either entirely or partially outside of the vaporization column in an apparatus in which no formation of benzene vapors takes place. Thus no incrustations can occur in the apparatus which again heats the liquid residue from the individual stages.

In the vaporization column which is constructed, by the method of the present invention, in stages, the polymer formed in the benzene by the heat pretreatment is enriched to the last stage so that finally a liquid product can be withdrawn from the last stage and it contains in addition to a slight amount of benzene practically all the polymer which normally must be separated from the liquid benzene in a special heat separator. The residual benzene can be recovered from the residue of the last vaporization stage by a special treatment. The process of the present invention also has additional advantages. Modern pressure refining plants often operate not with pure hydrogen gas but with coke oven gas, the main constituent of which is hydrogen. However, coke oven gas also contains resin formers which, when the coke oven gas is heated dry to certain temperatures, produce high-boiling, resinous or gum-like products which in time clog the lines or heating apparatus. By counter-current flow of the liquid benzene on the one hand and coke oven gas on the other in vaporization apparatus containing several stages, the resin-forming constituents of the coke oven gas are washed out by the liquid benzene and are withdrawn from the benzene in the lowest stage together with the polymer and are thus separated from the process.

Depending on the content of polymer in the crude benzene and the hydrogen-containing gas, and depending on the amount of benzene which is vaporized in each stage, a considerable enrichment of polymerization product occurs in the residue of the last stage. In order, also, to avoid with certainty the deposition and incrustation of high-boiling products in the last (lowest) stage of the vaporizer, according to another aspect of the invention, a small amount of wash oil, or the like, is continuously or intermittently added to the reheated liquid residue from the next to the last vaporization stage. The boiling point of the wash oil is so high that no noteworthy vaporization occurs so that sufficient solvent for the polymer is always available in the lowest vaporization stage. Slight amounts of wash oil which are vaporized in the lowest stage are again condensed in the following stage so that the benzene vapors do not contain impurities of wash-oil vapors. The residue containing wash oil is treated in an apparatus for removal of pitch from the spent wash oil in which benzene and wash oil are recovered on the one hand in separate fractions and a pitch-like residue on the other hand. The addition of wash oil to the last vaporization stage also has the additional advantage that more benzene can be vaporized in this stage—without danger of incrustation—than is possible without the addition of wash oil.

In order to increase the amount of heat which is supplied to the vaporizing column by reheating the residue of one stage, one can, if desired, recycle the residue of one stage through this stage and reheat the apparatus. Depending on the number of recirculations within the same stage the amount of heat available in this stage can be varied within practically any limits.

It is also possible to construct (outside of the actual vaporizing column) apparatus (for example, heat exchangers or the like) for reheating the liquid residue of the individual stages as well as the inlet and outlet lines in such manner that a subsequent polymerization of the polymerizable, organic compounds still present in the liquid material under certain circumstances occurs therein so that the effect of the countercurrent scrubbing in the vaporizer is further assisted. Depending on the degree of impurity of the crude benzene it is possible under certain circumstances, if the temperature and residence time in the so-called heat exchanger are suitable, to relinquish entirely the special polymerization usually connected with the vaporizer.

In order also to remove the last traces of chemical compounds which can cause trouble in the catalyst contact oven and which escape from the vaporizer with the mixture of benzene vapors and hydrogen, it is advantageous under certain circumstances to scrub this mixture of benzene vapors and hydrogen with a pressure raffinate. If desired, a special scrubbing stage can be provided for this purpose for the overhead of the vaporizer for scrubbing the mixture of vapors with a pressure raffinate. This scrubbing stage can naturally also be provided and operated as a special unit separate from the vaporizing column.

An apparatus for carrying out the process of the present invention is schematically illustrated in the drawing.

The crude benzene is flowed from line 2 through compressor 4 into heat exchanger 6 which it leaves at a temperature of about 210° C. The temperature of the heating coils used in heat exchanger 6 is so chosen that no vaporization of benzene takes place. For example, when the pressure in the contact oven amounts to about 45 atmospheres, a temperature of about 230–250° C., or somewhat higher in the heating coils in exchanger 6, has been proven satisfactory. The thus preheated, liquid benzene passes through line 8 in polymerization hold oven 10 in which the liquid benzene remains a certain period of time in order to make possible the formation of high-boiling polymer from certain impurities of the benzene. Then the still liquid benzene at a temperature of about 210° C. is passed through line 12 into vaporizing column 14. Vaporizing column 14 has, in the presently illustrated form, three stages 15, 16 and 17, each of which consists of a column of packing material 18, a distributing device 19 for the liquid benzene, collecting means 20 for the liquid residue, and a reheater 21 or 22 for the liquid residue. The liquid benzene is distributed as uniformly as possible, by distributing means 19, throughout the column of packing material 18 and comes in contact thereby with the hydrogen-containing gas which is added at the foot of the column through line 23. The hydrogen-containing gas is enriched thereby with benzene vapors, so that as a result of the removal of heat by the partial vaporization of the benzene the temperature of the liquid residue which is collected on intermediate stage bottoms 20 is decreased from about 210° C. to about 130° C. About 60 percent of the liquid benzene added is vaporized in the first stage.

The residue which is collected on the first intermediate stage bottom 20 is flowed through line 24 into heater 21 in which the temperature of the liquid benzene is again returned to the original value of about 210° C., without vaporization. The liquid benzene is then flowed through line 25 into the distributing device of the next lower stage 16 wherein an additional vaporization takes place. The liquid residue accumulating in stage 16, the temperature of which was lowered to about 130° C., is flowed by line 24′ through heating device 22 and, after it is again brought to a temperature of 210° C., is further passed into the distributing device of the next lower stage by line 25′ together with wash oil from line 25″. A residual liquid finally accumulates on the bottom of the vaporizer 14 which contains in addition to a slight amount of benzene the principal amount of polymer from the benzene or the coke oven gas. This residue is withdrawn through line 26 and can then be subjected to a special treatment for recovery of the residual benzene stage 48.

The hydrogen-containing gas added through line 23 at a temperature of about 180° C., consists of two parts. The main part is reflux gas which is set free after condensation of the benzene purified in the contact oven and after it is returned to operating pressure in an intermediate compressor 27 and is heated in heat exchanger 28 to about 210° C., it is introduced through line 30 to line 23. In line 23 there is also added fresh, hydrogen-containing gas, for example, fresh coke oven gas which arrives through line 31 in compressor 32 where it is compressed to operating pressure whereby its temperature increases to about 120°. It is then mixed with the reflux gas in 23 by line 34 controlled by valve 33. It is of significance that the fresh coke oven gas is not additionally heated since otherwise deposits could occur in the pipelines.

The temperatures of the fresh gas and the reflux gas and their proportions are so regulated that the mixture flowing through line 23 to the vaporizer 14 has temperature of about 180° C., as indicated.

The hydrogen gas laden with benzene vapors flows from vaporizer 14 through line 35 to the aforesaid special scrubbing stage 50 and arrives in heat exchanger 36 in which it is heated to a temperature of about 320° C. by heat exchange with the hot mixture of benzene vapors and hydrogen leaving catalyst contact oven 38 at about 350° C. The mixture of gas and vapors enters contact oven 38 at this 320° C. temperature. After flowing through the contact oven in which the temperature of the mixture of gas and vapors is heated to about 350° C. as a result of the exothermic reaction, the gas flows through line 39, heat exchanger 36, heater 6 and through line 40 to condenser 41, in which the condensable constituents, especially the benzene, are liquefied. The liquid product is flowed into collector 42 from which it can be withdrawn through line 43. The hydrogen gas is withdrawn through line 44. A part thereof is again returned under expansion through line 45 into the main gas line, while the greater part is recycled through line 46 to the vaporizer.

Heat exchanger 28 as well as both heaters 21 and 22 can, for example, be provided with heat by a heating plant 47 operating with steam. However, it is also possible to use other types of heating means for these apparatus.

The example illustrating the invention refers principally to the use of a hydrogen-containing gas which contains tarry or other polymerizable constituents, as for example, coke oven gas. In such a case it is necessary that the temperature of the gas before its entrance into the vaporizer and in the vaporizer itself does not exceed about 230° C., since otherwise the tarry and miscellaneous polymerizable constituents of the gas could give rise to precipitations and incrustations. In this case the liquid residue of each stage would be entirely or partially withdrawn from the vaporizer and reheated in indirect heat exchangers while avoiding vaporization of the benzene, and thus the temperature decrease resulting from the vaporization of the benzene in the vaporizer itself would be again equalized.

If a comparatively pure hydrogen gas is used instead of fresh gas for the pressure refining, in reheating of the liquid residue of each vaporization stage it is not necessary to withdraw this residue from the vaporizer and reheat it in an indirect heat exchanger. Instead, in this case, the hydrogen gas laden with benzene vapors can be entirely or partially withdrawn from each or only from individual stages by lines 51, heated to such temperatures in heaters 52, and then again conveyed into the next higher stage by lines 53 in such manner that the heat necessary for vaporization of additional benzene is available in this manner to the vaporizer. The temperature to which the hydrogen gas must be heated is determined according to the output of the vaporizer which must be carried out in the next stage.

If desired, the heat required for vaporization of the benzene can also be brought into the vaporizer partially by heating the liquid residue and partially by heating the hydrogen gas.

The invention claimed is:

1. In a process of purification of crude benzene compounds which comprises, heating the benzene first in liquid state under pressure to form polymers from impurities, then subjecting it to a holding treatment for formation of polymer from the impurities, vaporizing the benzene leaving a residue of the polymers of the impurities, and finally pressure refining the crude benzene compounds in the vapor phase with hydrogen containing coke oven gas under pressure at increased temperature above 320° C. in the presence of a catalyst; the improvement comprising effecting the aforesaid vaporization of the benzene in several successive stages in the absence of indirect heat but in the presence of, and under saturation by, an up-flow of the hydrogen containing coke oven gas and down-flow of the liquid benzene to be purified in each stage at a temperature not higher than 210° C. in such manner that in each stage a part of the liquid is vaporized at a temperature below the vaporization point of the polymerized impurities with a temperature decrease of the liquid residue of that stage, and the vapors and gases from each lower stage pass on into and through the next upper stage, supplying all the heat for effecting said vaporization in said stages at a temperature not higher than 210° C. at a region outside said stages by withdrawing liquid residue separately from each upper stage and heating the liquid withdrawn from each upper stage again, without noteworthy formation of vapors, up to the same temperature again for further vaporization of benzene in the next succeeding lower stage by the addition of all heat by indirect heating outside the stages, returning the so heated liquid from each upper stage to the next lower stage and effecting vaporization of additional benzene therein, and withdrawing from the lowest stage a liquid residue containing the polymer.

2. The process of claim 1 in which the mixture of benzene vapors and hydrogen is subjected after its vaporization as aforesaid but before its introduction to the catalyst to a scrubbing with pressure refinement.

3. In a process of purification of crude benzene compounds which comprises, heating the benzene first in liquid state under pressure to form polymer from the impurities, then subjecting it to a holding treatment for formation of polymer from the impurities, vaporizing the benzene leaving a residue of the polymers of the impurities, and finally pressure refining the crude benzene compounds in the vapor phase with hydrogen containing coke oven gas under pressure at increased temperature above 230° C. in the presence of a catalyst; the improvement comprising effecting the aforesaid vaporization of the benzene in several successive stages in the absence of indirect heat but in the presence of, and under saturation by, an up-flow of the hydrogen containing coke oven gas at a temperature not higher than 180° C. and down-flow of the liquid benzene to be purified in each stage at a temperature not higher than 210° C. in such manner that in each stage a part of the liquid is vaporized by the gas and crude benzene at a temperature below 210° C. with a temperature decrease of the liquid residue of that stage, and the vapors and gases from each lower stage pass on into and through the next upper stage, supplying all the heat for effecting said vaporization in said stages at a temperature not higher than 210° C. at a region outside said stages by withdrawing liquid residue separately from each upper stage and heating the liquid withdrawn from each upper stage again, without noteworthy formation of vapors, up to the temperature not higher than 210° C. for the next succeeding lower stage by the addition of indirect heat outside the stages, returning the so heated liquid from each upper stage to the next lower stage for vaporization of additional benzene therein, and withdrawing from the lowest stage a liquid residue containing the polymer.

4. A process as claimed in claim 3 and in which the liquid is withdrawn from each stage at a temperature of about 130° C. and is preheated to and passed into the next stage at a temperature of about 210° C., and the hydrogen containing coke oven gas is initially introduced to the last stage at a temperature of about 180° C.

References Cited in the file of this patent

UNITED STATES PATENTS

| | | |
|---|---|---|
| 848,903 | Hirzel | Apr. 2, 1907 |
| 1,662,105 | Doherty | Mar. 13, 1928 |
| 1,672,978 | Fisher | June 12, 1928 |
| 2,216,372 | Lyman et al. | Oct. 1, 1940 |
| 2,638,437 | Ragatz | May 12, 1953 |
| 2,701,267 | Urban et al. | Feb. 1, 1955 |
| 2,710,278 | Gilmore | June 7, 1955 |
| 2,753,387 | Love | July 3, 1956 |

FOREIGN PATENTS

| | | |
|---|---|---|
| 244,130 | Great Britain | Jan. 13, 1927 |